(12) United States Patent
Albinson et al.

(10) Patent No.: US 8,314,157 B2
(45) Date of Patent: Nov. 20, 2012

(54) MICROWAVE-ENHANCED PROCESS TO TREAT MARINE EMULSION WASTES

(75) Inventors: Kenneth R. Albinson, Somerdale, NJ (US); Scott Jensen, Kingwood, TX (US); Mark J. Porter, Crosby, TX (US); Kevin Maki, Humble, TX (US)

(73) Assignee: Imperial Petroleum Recovery Corp., The Woodlands, TX (US)

( * ) Notice: Subject to any disclaimer, the term of this patent is extended or adjusted under 35 U.S.C. 154(b) by 1154 days.

(21) Appl. No.: 11/489,919

(22) Filed: Jul. 20, 2006

(65) Prior Publication Data

US 2007/0017876 A1 Jan. 25, 2007

Related U.S. Application Data

(60) Provisional application No. 60/701,273, filed on Jul. 21, 2005.

(51) Int. Cl.
*C09K 3/00* (2006.01)
*B63J 4/00* (2006.01)
*C02F 1/30* (2006.01)

(52) U.S. Cl. .......... 516/53; 114/183 R; 204/157.15; 210/748.01

(58) Field of Classification Search .......... 516/53; 210/748; 114/183 R; 204/157.15
See application file for complete search history.

(56) References Cited

U.S. PATENT DOCUMENTS

| | | | |
|---|---|---|---|
| 5,514,820 A | 5/1996 | Assmann et al. | |
| 5,578,090 A | 11/1996 | Bradin | |
| 5,911,885 A * | 6/1999 | Owens | 210/748.07 |
| 5,914,014 A | 6/1999 | Kartchner | |
| 6,077,400 A | 6/2000 | Kartchner | |
| 6,086,830 A | 7/2000 | Kartchner | |
| 6,174,501 B1 | 1/2001 | Noureddini | |
| 2004/0167233 A1 * | 8/2004 | Varadaraj | 516/197 |
| 2006/0162245 A1 | 7/2006 | Porter et al. | |

OTHER PUBLICATIONS

Mazzocchia et al. "Fatty Acid Methyl Esters Synthesis from Triglycerides Over Hetergeneous Catalysts in Presence of Microwaves." Comptes Rendus Chimie, 7(6-7) pp. 601-605, (2004).
Kinver, M., "Microwaves 'cook ballast aliens'", BBC News, [retrieved from the Internet on Sep. 7, 2011 using <URL: http://newsvote.bbc.co.uk/mpapps/pagetools/print/news.bbc.co.uk/2/hi/science/nature/7392072.stm>].

* cited by examiner

*Primary Examiner* — Ling Choi
*Assistant Examiner* — Chun-Cheng Wang
(74) *Attorney, Agent, or Firm* — Locke Lord LLP

(57) ABSTRACT

Improved method, apparatus and system for treating bilge water and other marine emulsion wastes comprising water and hydrocarbon, and possibly solids in some cases. Microwave Separation Technology (MST) is used to treat a broad class of emulsion wastes associated with, generated by, or carried at sea on, ships or other marine entities (such as drilling platforms, oil spill clean-up systems, etc.). The hydrocarbon component from a marine emulsion waste comprising water and hydrocarbon, and possibly solids in some cases, is concentrated (e.g., the emulsion's water content is reduced) so that the volume of waste material that requires off-loading or out-hauling (or both) is reduced over conventional methods of separating emulsion wastes for disposal. In view of the reductions achieved in process volumes, significant cost savings may be realized. Better compliance with environmental laws and standards may also be realized.

14 Claims, 2 Drawing Sheets

MICROWAVE-ENHANCED PROCESS TO TREAT MARINE EMULSION WASTES

CROSS-REFERENCE TO RELATED APPLICATIONS

This application claims priority to, and hereby incorporates by reference in its entirety, U.S. patent application Ser. No. 60/701,273 entitled "Microwave-Enhanced Process to Treat Marine Emulsion Wastes" by Kenneth Albinson, Kevin Maki, Mark Porter and Scott Jensen, filed Jul. 21, 2005.

BACKGROUND

Bilge water and other marine emulsion wastes that contain hydrocarbons present significant storage, processing and disposal challenges for marine operators worldwide. Most current onboard systems for processing bilge water, for example, utilize some combination of conventional tank settling and centrifugation for separation of emulsion components. Furthermore, well known chemical additives are often utilized in order to render some water-enriched portion of the emulsion waste suitable for discharge into ocean waters. Remaining portions, which often yet comprise predominately water, are typically placed in containers and offloaded in port for further processing and disposal onshore.

The discharge of any fuel, oil or water-oil mixture (whether as bilge water or other forms of marine emulsion wastes comprising water and hydrocarbon) is subject to, among other standards, the stringent requirements of the Clean Water Act of 1972 (e.g., 33 U.S.C. 1321 "Oil and hazardous substance liability") and the Oil Pollution Act of 1990 (33 U.S.C. 2701 et seq.). Standards set by maritime organizations are also sensitive to ship discharges of any oil or oily mixture as set forth in Annex 2 of the International Maritime Organization's "Report of the Marine Environment Protection Committee on Its Fifty-Second Session," dated 1 Nov. 2004.

In general, environmental laws and standards that limit discharging bilge water and other marine emulsion wastes (e.g., oil-contaminated water from ballast or cargo tanks, or oily mixtures from crude oil washing systems or slop tanks) into ocean waters have become more stringent. On one hand, operators are faced with stiff fines if they do not comply with these laws. On the other hand, operators must often incur high costs in order to either process wastes onboard or offload and dispose of wastes onshore if onboard processing is inadequate. Embodiments presented herein facilitate, among other things, reducing compliance costs and promote economic disposal of the oil and environmentally benign disposal of the water.

BRIEF SUMMARY OF THE DRAWINGS

A more complete understanding of embodiments may be obtained by reference to the following Detailed Description when taken in conjunction with the accompanying Drawings wherein.

BRIEF SUMMARY

Figure 1:
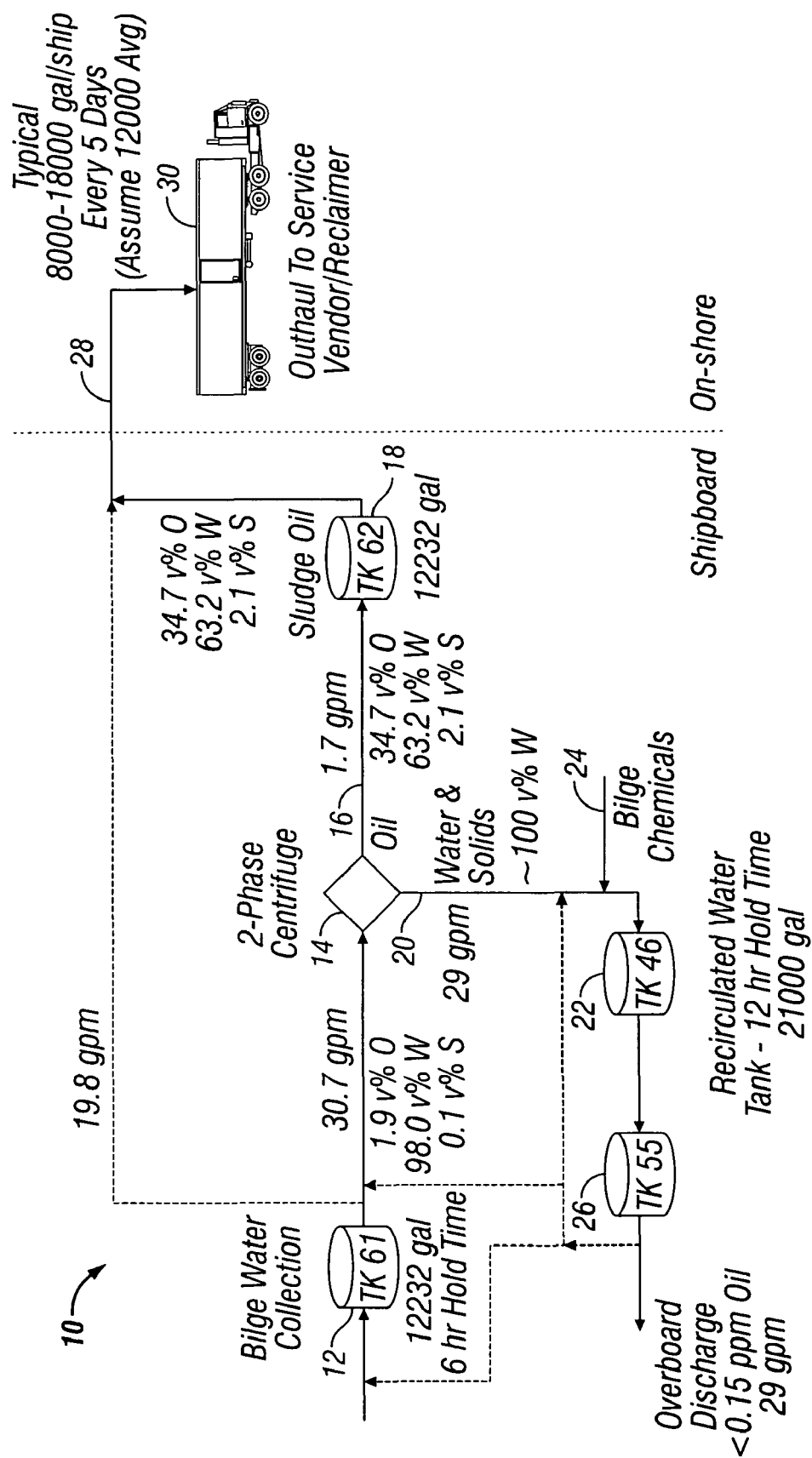
FIG. 1 is a simplified sample process flow diagram of a contemporary bilge water handling process.

Embodiments presented herein provide, among other things, improved methods for treating bilge water and other marine emulsion wastes comprising water and hydrocarbon. In particular, embodiments relate to the use of Microwave Separation Technology (MST) to treating of emulsion wastes associated with, generated by, or carried at sea on, ships or other marine entities (such as drilling platforms, oil spill clean-up systems, etc.). Embodiments facilitate, among other things, concentrating the hydrocarbon component from a marine emulsion waste comprising water and hydrocarbon by reducing the emulsion's water content so that the volume of waste material that is required to be off-loaded or out-hauled (or both) is reduced over conventional methods of preparing emulsion wastes for end processing and disposal. In view of the reductions achieved in process volumes, significant cost savings may be realized. Reducing process volumes helps economics because many process costs such as, for example, offloading or out-hauling, are largely assessed on a per volume (e.g., per barrel) basis. As a consequence, compliance with environmental laws, regulations and standards may also be improved.

According to some embodiments, MST is utilized to optimize either onboard or onshore treatment of bilge water and other marine emulsion wastes comprising water and hydrocarbon in order to reduce either or both: 1) the volume of emulsion waste requiring offloading and out-haul to, and treatment at, a reclamation site; and 2) the likelihood of an operator incurring environmental noncompliance penalties. In particular, preferred embodiments take advantage of methods designed for processing crude oil emulsions using microwave energy as described in U.S. Pat. No. 5,914,014, U.S. Pat. No. 6,077,400, and U.S. Pat. No. 6,086,830, which are each incorporated by reference herein in their entirety, to treat bilge water and other marine emulsion wastes comprising water and hydrocarbon, and possibly solids in some cases.

For onboard systems, MST equipment as described in U.S. Pat. No. 6,086,830, for example, is miniaturized or compacted to accommodate the volume of marine emulsion generated on a particular vessel and utilized in preferred embodiments in order to minimize space requirements. The adjustment in size to accommodate flow rates is well within the skill of the average engineer skilled in the art. For onshore systems, which may be located dockside or offsite (e.g. at an inland reclamation center), utilization of standard industrial-size MST equipment as described in the aforementioned patents is generally preferred.

The unique characteristics of microwave energy—specifically, the establishment of rapidly oscillating electric and magnetic fields that selectively energize strongly polar and strongly charged molecules relative to non-polar and neutral, or less polar and weakly charged, molecules—allow microwaves to facilitate certain physical and/or chemical reactions. Patents are directed to methods (see U.S. Pat. No. 5,914,014 and U.S. Pat. No. 6,077,400), as well as to apparatuses and systems (see U.S. Pat. No. 6,086,830), for using microwave energy to facilitate the separation of crude oil emulsions in the processing of crude produced petroleum. None of these patents, however, extend MST technology to treating bilge water and other marine emulsion wastes comprising water and hydrocarbon. Embodiments presented herein accomplish this.

Specifically, embodiments provide an improved method for concentrating the marine emulsion waste by subjecting a hydrocarbon enriched portion of the waste to MST to break the hydrocarbon water emulsion and allow concentration of the oil portion of the emulsion. Specifically, the preferred improvement would be to incorporate the MST step of the process after separation steps had been performed in a conventional manner. It would be specifically preferred to centrifuge the marine emulsion waste to create a water-enriched portion and a hydrocarbon enriched portion followed by subjecting the hydrocarbon enriched portion to the MST. However, MST may also be applied within an existing conventional bilge separation process to optimize separation by an existing centrifuge, tank, or other separation device, and this application of MST is also comprehended by, and included in, embodiments of this disclosure.

As used throughout this specification and claims, the term MST refers to microwave separation technology either in the form of an apparatus or as a step in a clean-up method or system.

DETAILED DESCRIPTION

For implementation onboard, MST equipment of a miniaturized or compacted scale is utilized in preferred embodiments in order to minimize space requirements. Process steps that make use of this MST equipment of a miniaturized or compacted scale, however, generally remain unchanged. Equipment of one design, referred to herein as a Marine MST (MMST) design, is integrated in preferred embodiments into an existing emulsion waste treatment system at an optimal location (or locations) onboard a vessel (e.g., ship or marine drilling or collection platform). This will enhance the performance of the overall system by separating water that may be disposed of in an environmentally benign manner thus reducing the volume of waste material that is stored onboard and eventually offloaded, and possibly out-hauled, for end processing and disposal. Some details of MMST implementation may be unique for each ship or other vessel, but MMST generally has an advantage of being available at almost all times while a ship or other vessel is in service at sea. In particular, MMST could be used to treat bilge water and other marine emulsion wastes as they are formed. The MMST equipment design can be made by the ordinary engineer using the basic MST design as set forth in U.S. Pat. No. 6,086,830 above, for example.

Using processes that incorporate MMST, water-enriched portions of many marine emulsion wastes could be obtained that have a purity level meeting or exceeding a purity level required for discharge into ocean waters. On the flip side, hydrocarbon-enriched portions of some marine emulsion wastes could be further concentrated by processes that incorporate MMST to a level that would allow its use as fuel. Furthermore, MMST may be utilized not only on ships, but also on drilling platforms, collection platforms and other water-associated systems (including inland systems) where space may be limited. For example, MMST or MST could be utilized in the clean up of oil spills (and spills of other hydrocarbon materials that form emulsion wastes with water) in rivers or small inland lakes, as well as in municipal waterways or municipal water treatment and purification systems.

For onshore systems, standard industrial-size MST equipment is utilized in preferred embodiments (minimizing space requirements is generally not required onshore). MST equipment may be located either dockside or offsite (for example, at an inland waste reclamation center). For onshore/dockside implementation, emulsion wastes may be offloaded from the vessel directly into MST process flow points. Like onboard implementation, dockside implementation can reduce the volume of emulsion waste that must be hauled away and subject to an end treatment offsite. Bilge water and other emulsion wastes from any ship that is capable of docking may be treated through dockside implementation.

For onshore/offsite implementation, bilge water and other marine emulsion wastes comprising water and hydrocarbon are transported to, typically, a further inland location. Before a full vendor treatment is applied, the emulsion waste (e.g., sludge oil) is subject in preferred embodiments to MST treatment at the further inland location in order to reduce the volume of waste requiring more costly, full vendor treatment. In particular, MST treatment may be integrated into an existing onshore/offsite waste treatment system in order to optimize performance of the overall process. Onshore/offsite implementation may readily be utilized in treating non-marine, as well as marine, emulsion wastes comprising water and hydrocarbon. To carry out onshore/offsite implementation near established remediation sites may be particularly advantageous.

Turning to FIG. 1 which depicts a schematic diagram of a present typical bilge water treatment system 10, it is shown that the bilge water is collected in a tank 12 then passed through a two-phase centrifuge 14 where the oil phase is separated from water and any solids contained in the bilge water (though a typical flow rate is 30.7 gallons per minute (gpm) between tank 12 and centrifuge 14 is indicated in FIG. 1, these and other indicated flow rates can vary widely, as would be appreciated by an average engineer skilled in the art in light of this disclosure). The oil exits the centrifuge 14 through line 16 and thence to holding tank 18. The water and solids stream exits the centrifuge 14 through lines 20 and thence to storage tank 22. In a typical arrangement, well known water treating chemicals would be introduced into the system through line 24 either before or in the tank 22. The water would typically be treated such that it could be stored in tank 26 in a condition for benign disposal at sea. The sludge oil remaining, being of a volume of about 3% of the original bilge water separation would then be stored in tank 18 for offloading through line 28 into a transport vehicle 30. The flow rates and volume calculations and analyses as shown on FIG. 1 for a bilge water collection from a cruise ship typify the relative concentrations of water, oil and solids found in bilge water and the separation achieved through the use of two-phase centrifuge alone. Of course, the volume and concentration may also vary widely depending upon the vessel involved. It is demonstrated by FIG. 1 that the initial volume reduction in the centrifuge leaves about 3% of an oil enriched stream which still carries approximately 60% water. Further reduction in volume is achieved by the use of MST as shown in FIG. 2.

Figure 2:
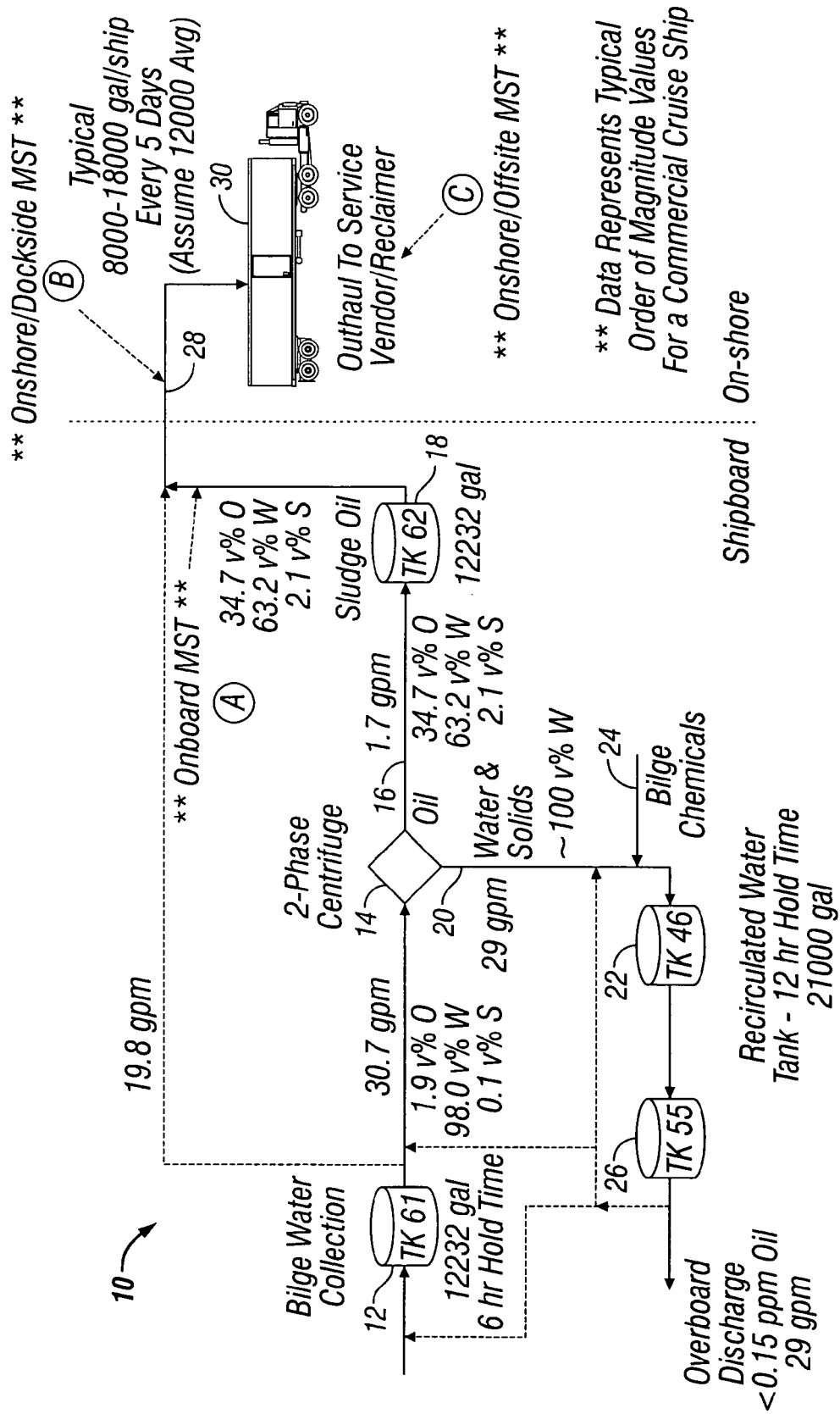
FIG. 2 is a simplified sample process flow diagram showing three preferred potential sites for Microwave Separation Technology (MST) equipment (i.e., A: onboard; B: onshore/dockside; and C: onshore/offsite) in an improved bilge water handling process.

FIG. 2 shows the system described in FIG. 1 using the same numerical designations for identical elements of the system with three preferred alternate insertion points of microwave treating apparatus. Any of these three preferred locations of MST implementation, A) MMST or onboard implementation; B) onshore/dockside implementation; and C) onshore/offsite implementation can be used to reduce waste volumes before costly, full vendor treatment is applied. In view of the importance that reducing waste volumes has for lowering costs associated with processing marine emulsion wastes, embodiments may significantly lower costs associated with treating bilge water and other marine emulsion wastes comprising water and hydrocarbon. In view of these reduced waste volumes, operators are also more likely to achieve compliance with environmental laws and standards. Consequently, they are less likely to incur environmental noncompliance penalties.

Example 1

MST Treatment of Bilge Water Waste

A sample of bilge water from a cruise ship was obtained after the centrifuge separation and subjected to exposure to MST for further separation. Results of the laboratory scale study using MST to treat bilge water samples obtained from a marine cruise ship are shown in TABLES 1 & 2.

TABLE 1

Emulsion Component Separation (Standard Centrifuge Method Test)

| Intensity of MST Treatment | Low | High |
|---|---|---|
| % (v/v) Water & Solids Resolved without MST Treatment | 76 | 76 |
| % (v/v) Water & Solids Resolved with MST Treatment | 88 | 94 |

TABLE 2

Comparison of Primary Waste Streams

|  | Low | High |
|---|---|---|
| Intensity of MST Treatment (MST Trt) Bilge Water Waste | | |
| Oil | 34.7 | 34.7 |
| Water | 63.2 | 63.2 |
| Solids | 2.1 | 2.1 |
| Relative Volume (%) | 100 | 100 |
| Waste after MST Trt | | |
| Oil | 88.8 | 94.1 |
| Water | 10.5 | 5.6 |
| Solids | 0.7 | 0.4 |
| Relative Volume (%) | 37 | 35 |
| % (v/v) Waste Out-Haul Reduction with MST Treatment | 63 | 65 |

In the foregoing test, low intensity MST is that level of microwave which would produce a temperature rise in the emulsion across the MST applicator of about 25° F. High intensity microwave exposure would increase the temperature of the emulsion through the applicator of about 100° F. While it is clearly demonstrated through the results of the above-identified experiments that significant separation occurs throughout the range of intensity of exposure to the microwave energy, for purposes of this application where the term "low intensity" is used, it will be understood that the temperature increase across the equipment would be from about 20° F. to about 40° F., and, for the term "high intensity," the temperature increase across the equipment would be from about 85° F. to about 110° F. It should be understood that one of ordinary skill in the art could adjust the intensity of the microwave energy to accommodate the volumes and degree of contamination within the bilge water being treated.

A standard laboratory centrifuge test was utilized to evaluate the stability of marine emulsion wastes and their propensity to undergo separation into water-enriched and hydrocarbon-enriched portions. As detailed in Table 2, the primary waste stream (i.e., not treated with MST) contained 63.2% (v/v) water, 34.7% (v/v) oil (hydrocarbon) and 2.1% (v/v) solids. After low-intensity MST treatment, waste volume was reduced by about 63% (v/v). After high-intensity MST treatment, waste volume was reduced by about 65% (v/v). Water concentration in the waste after high-intensity MST treatment was reduced to as little as 5.6% (v/v). Given that many costs (e.g., out-haul costs) are incurred on a per volume (e.g., per barrel) basis, reliance on MST to treat bilge water and other marine emulsion wastes comprising water and hydrocarbon could significantly reduce costs.

Example 2

Process Flow for MST Treatment of Bilge Water Waste

Process flow for typical treatment of bilge water does not include the use of MST. Process flow for such typical treatment is shown in FIG. 1. Unprocessed bilge water (and optionally recirculated water as well as one or more separation-enhancing chemicals, e.g., "bilge chemicals") is (are) collected in tank 12. In this tank, a hydrocarbon-enriched portion may separate "passively" from a water-enriched portion of the marine emulsion waste. Either the marine emulsion waste or a hydrocarbon-enriched portion thereof (e.g., 1.9% (v/v) oil, 98.0% (v/v) water, and 0.1% (v/v) solids) is subjected to centrifugation, preferably, two-phase centrifugation in centrifuge 14. In order to promote separation of water from hydrocarbon before or during centrifugation, a separation-enhancing chemical may be added before or during centrifugation to the marine emulsion waste or the hydrocarbon-enriched portion thereof. A further hydrocarbon-enriched portion that is generated after centrifugation (e.g., as sludge oil composed of 34.7% (v/v) oil, 63.2% (v/v) water, and 2.1% (v/v) solids) is stored in tank 18 before being offloaded from a ship, loaded onshore onto a truck 30 and out-hauled to an onshore/offsite service vendor for end processing and disposal.

A process flow similar to typical treatment of bilge water as shown in FIG. 1 is used for a process flow that includes MST treatment shown in FIG. 2. A first category of potential sites for MST treatment equipment includes onboard locations (e.g., see arrow from "Onboard MST" and the encircled "A" of FIG. 2). Again, onboard MST equipment of a miniaturized or compacted scale (also known as MMST equipment) is utilized in preferred embodiments in order to minimize space requirements. A second category of potential sites for MST treatment equipment is onshore/dockside (e.g., see arrow from "Onshore/Dockside MST" and the encircled "B" of FIG. 2). A third category of potential sites for MST treatment equipment is onshore/offsite (e.g., see arrow from "Onshore/Offsite MST" and the encircled "C" of FIG. 2). For each of these categories, MST treatment as disclosed in U.S. Pat. No. 5,914,014, U.S. Pat. No. 6,077,400, and U.S. Pat. No. 6,086,830, is used to separate water for disposal and concentrate hydrocarbon of the waste in these preferred embodiments.

As shown in this example, a hydrocarbon rich system composed of 34.7% (v/v) oil, 63.2% (v/v) water, and 2.1% (v/v) solids was used as feedstock for low intensity MST treatment onshore/dockside. From this MST treatment, a waste composed of 88.8% (v/v) oil, 10.5% (v/v) water, and 0.7% (v/v) solids may be recovered for a waste volume reduction of about 63% (v/v) (Table 2).

When the same sludge oil was used as feedstock for high intensity MST treatment onshore/offsite, a waste composed of 94.1% (v/v) oil, 5.6% (v/v) water, and 0.4% (v/v) solids may be recovered for a waste volume reduction of about 65% (v/v) (Table 2).

Although various embodiments of the disclosed method, apparatus and system have been illustrated in the accompanying Drawings and described in the foregoing Detailed Description, it will be understood that the method, apparatus and system are not limited to the preferred embodiments disclosed, but are capable of numerous rearrangements, modifications and substitutions (as persons skilled in the art will see on reference to the description of embodiments disclosed herein), and it is contemplated that the appended claims will encompass such rearrangements, modifications and substitutions.

What is claimed is:

1. A method to concentrate hydrocarbon from a feedstock derived from a marine emulsion waste comprising water and hydrocarbon, the method comprising:
    subjecting a collected marine emulsion waste comprising water and hydrocarbon, or a hydrocarbon-containing portion of the collected marine emulsion waste, to centrifugation in order to separate the marine emulsion waste, or the hydrocarbon-containing portion thereof, into a water-enriched portion and a hydrocarbon-enriched portion;
    recovering a feedstock comprising at least part of the hydrocarbon-enriched portion; and
    subjecting recovered feedstock to microwave separation technology (MST) in order further to concentrate hydrocarbon from the feedstock.

2. The method of claim 1 additionally comprising adding a separation-enhancing chemical to the marine emulsion waste or a hydrocarbon-containing portion thereof.

3. The method of claim 1 wherein the subjecting the feedstock to MST is carried out onboard.

4. The method of claim 1 wherein the subjecting the feedstock to MST is carried out onshore.

5. The method of claim 4 wherein the subjecting the feedstock to MST is carried out dockside.

6. The method of claim 4 wherein the subjecting the feedstock to MST is carried out offsite.

7. A method to concentrate hydrocarbon from a feedstock derived from a marine emulsion waste comprising water and hydrocarbon, the method comprising:
    separating a marine emulsion waste, or a hydrocarbon-containing portion thereof, into a water-enriched portion and a hydrocarbon-enriched portion;
    recovering a feedstock comprising at least part of the hydrocarbon-enriched portion; and
    subjecting recovered feedstock to microwave separation technology (MST) in order to further concentrate hydrocarbon from the feedstock.

8. The method of claim 7 wherein separating is performed by subjecting the collected marine emulsion waste comprising water and hydrocarbon, or the hydrocarbon-containing portion of the collected marine emulsion waste, to centrifugation.

9. The method of claim 7 wherein the separating is performed by allowing the collected marine emulsion waste comprising water and hydrocarbon, or the hydrocarbon-containing portion of the collected marine emulsion waste, to separate in a tank.

10. The method of claim 7 additionally comprising adding a separation-enhancing chemical to the marine emulsion waste or a hydrocarbon-containing portion thereof.

11. The method of claim 7 wherein the subjecting the feedstock to MST is carried out onboard.

12. The method of claim 7 wherein the subjecting the feedstock to MST is carried out onshore.

13. The method of claim 12 wherein the subjecting the feedstock to MST is carried out dockside.

14. The method of claim 12 wherein the subjecting the feedstock to MST is carried out offsite.

* * * * *